Oct. 29, 1929.  E. B. BOUGHTON  1,733,936
LEVERAGE SYSTEM
Filed Feb. 9, 1929  2 Sheets-Sheet 1

Inventor
E.B.Boughton
By. [signature] Atty.

Oct. 29, 1929.  E. B. BOUGHTON  1,733,936
LEVERAGE SYSTEM
Filed Feb. 9, 1929  2 Sheets-Sheet 2

Inventor
E. B. Boughton

Patented Oct. 29, 1929

1,733,936

UNITED STATES PATENT OFFICE

EDWARD BISHOP BOUGHTON, OF LONDON, ENGLAND

LEVERAGE SYSTEM

Application filed February 9, 1929, Serial No. 338,758, and in Great Britain November 30, 1927.

This invention relates to hydraulic brake mechanism for use on motor road, rail and other vehicles in which the fluid pressure is produced by means of a pair of pistons one of which, acting on a low pressure piston, is of greater diameter than the other, which acts as a high pressure piston, the pistons being operated by common lever mechanism in such manner that a small and a large braking force are applied successively.

In the known arrangement of the kind referred to, the successive application of a small and a large braking force is effected by connecting the respective pistons to a common lever arranged in such a manner that the low pressure piston is first moved independently of the high pressure piston to take up all clearance in the systems and at the completion of its stroke is held stationary while the high pressure piston is subsequently moved to apply the brakes.

The invention has for its object to provide an improved hydraulic brake system of the kind referred to.

According to the invention, the low pressure and high pressure pistons are operated by lever mechanism arranged so that during the forward movement of the low pressure piston to take up play in the system, the high pressure piston is also moved forward, and so that when such play has been taken up, the forward movement of the low pressure piston may cease, while the movement of the high pressure piston is continued to apply the brakes.

The lever mechanism operating the fluid pressure pistons may comprise a main or primary lever positively connected to a member by which movement is communicated to the smaller or high pressure piston, and a bell-crank lever pivotally mounted upon the axis of the primary lever, one arm of the bell-crank lever being positively connected to the member by which movement is communicated to the larger or low pressure piston, while the other arm is resiliently connected to the primary lever in such manner that on further movement of the primary lever, the low pressure piston may remain stationary while the forward movement of the high pressure piston to apply the brakes continues.

The invention is hereinafter described by way of example with reference to the accompanying diagrammatic drawings, in which.

Figures 1, 3:
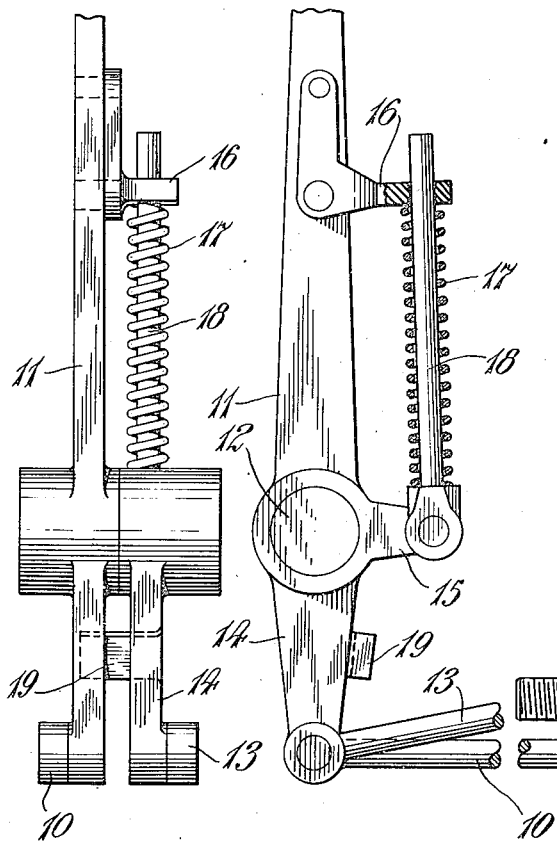
Figures 1 and 2 are views in side elevation respectively of a lever mechanism and fluid pressure producing means arranged in accordance with the invention.
Figure 3 is a rear elevation corresponding to Figure 1.
Figure 2:
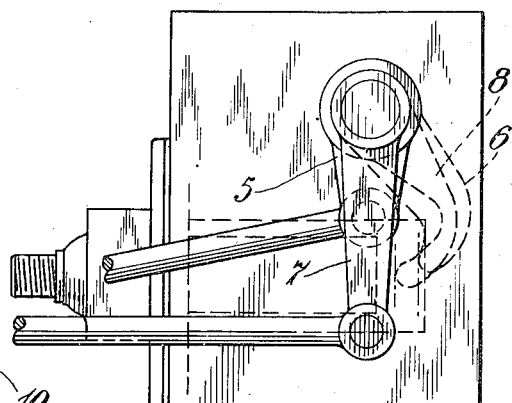
Figure 4:
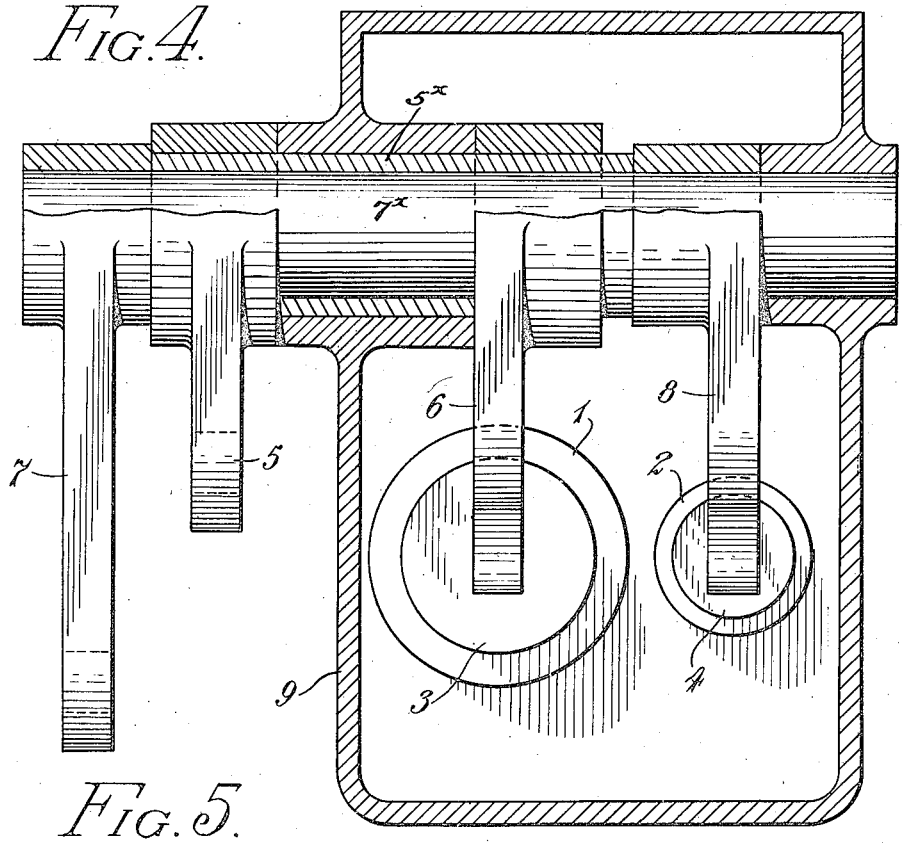
Figure 4 is a part cross-sectional view on an enlarged scale of the fluid pressure producing means shown in Figure 2.
Figure 5:
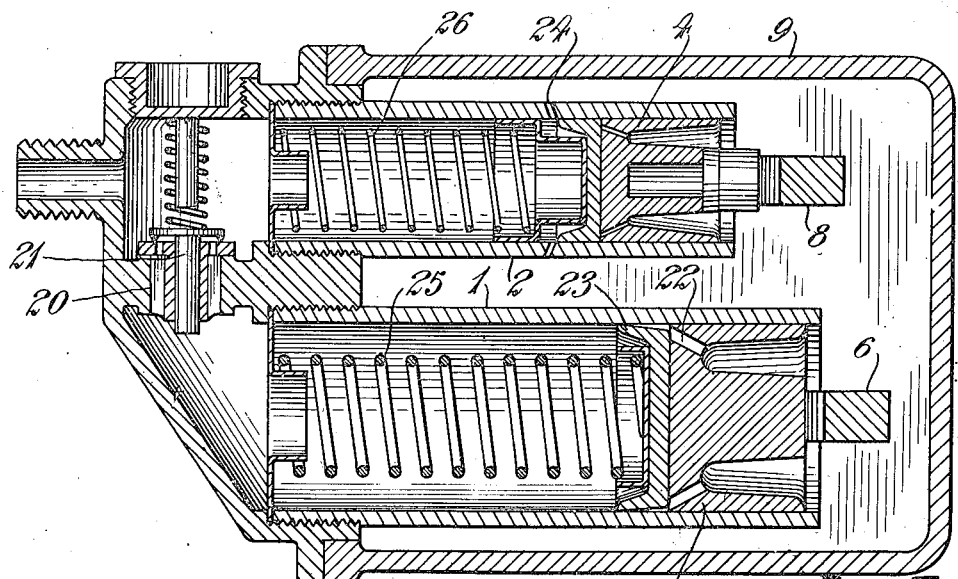
Figure 5 is a sectional plan view thereof.

In carrying the invention into effect according to a preferred construction, two cylinders 1, 2 of unequal diameter are provided, the respective pistons 3, 4 of which are acted upon by levers 5, 6 and 7, 8, the lever 5 preferably being of shorter length than the lever 7 so that greater leverage is exerted upon the smaller or high pressure piston 4. The levers 5 and 6 are fixed for simultaneous movement upon a sleeve $5^x$, rotatable on a suitably mounted shaft $7^x$, on which shaft the levers 7 and 8 are fixed. The cylinders 1, 2 are preferably contained in a vessel or tank 9 which supplies the operating fluid. The lever 7 (Figure 2) operating the high pressure cylinder 2 is connected by means of a rod 10 to the lower end of a main or primary operating lever 11 pivotally mounted upon a spindle 12. The lever 5 operating the low pressure cylinder 1 is connected by means of a rod 13 to the lower end of the downwardly extending arm 14 of a bell-crank lever pivoted upon the spindle 12 and having its other arm 15 connected to a fixed projection 16 on the primary lever 11 through the medium of a spring 17 conveniently supported by means of a guide rod 18 pivoted at its lower end to the bellcrank lever 15 and sliding at its upper part through a hole in the fixed member 16. The spring 17 is of a strength sufficient to overcome the resistance of the moving parts of the brake mechanism, and the arm 14 of the bell-crank lever is provided with a suitable stop 19 adapted to engage with the lower arm of the lever 11 in such manner that when the primary lever 11 is moved to the "off" position, it carries with it the bell-crank lever.

The two cylinders 1, 2 are connected together at their discharge ends by a passage 20 controlled by a one-way valve 21 of any suitable form adapted to prevent return flow of the pressure fluid from the braking system into the low pressure cylinder 1, it being understood that this valve 21 closes when the pressure in the high pressure cylinder 2 exceeds that in the low pressure cylinder 1. The low pressure cylinder 1 is provided in known manner with a non-return inlet valve at the piston end, such inlet valve being formed by the passages 22 and cup washer 23 which allow fluid to enter and fill the cylinder 1 as required. The high pressure cylinder 2 is provided with outlet ports 24 at the piston end to permit excess fluid to be returned into the container 9 after each operation or application of the brakes. The ports 24 also permit inflow of pressure fluid to the cylinder 2 to replenish any loss which might occur through slight leakage in the system and which would affect the operation on the next application of the brakes.

When it is desired to apply the brakes, the lever 11 is turned in a clockwise direction. Owing to the differences in the lengths of the levers 5 and 7, the low pressure piston 3 operated by the lever 5 is moved forward at a faster rate than the high pressure piston 4. The faster movement of the low pressure piston 3 combined with the greater diameter thereof ensures that the low pressure piston shall operate to take up the wear or play in the system with a very small movement of the operating lever 11, it being understood that the movement of the lever 11 is communicated to the low pressure piston through the spring 17, bell-crank lever 15, 14, rod 13 and levers 5 and 6. When all play has been taken up, continued movement of the lever 11, which is directly connected to the high pressure piston 4 through the rod 10 and levers 7 and 8, is permitted independently of the low pressure leverage system owing to the flexible connection comprising the spring 17 between the primary lever and the bell-crank lever. As the pressure in the high pressure cylinder 2 increases to a point above that exerted by the low pressure cylinder 1, the valve 21 closes and the high pressure system is then effective for applying the brakes with very slight additional movement of the lever 11. When the primary lever 11 is permitted to move back, the bell-crank lever is returned therewith by the engagement of the lever 11 with the stop 19 on the arm 14, and the pistons 3 and 4 are thrust back to their original position by means of springs 25, 26. Excess fluid in the high pressure cylinder thereupon escapes through the ports 24, while during the rearward movement of the piston 3 the low pressure cylinder 1 is replenished with fluid entering through the non-return inlet device 22, 23, so that the low pressure part of the device is ready for the next application of the brakes.

What is claimed to be new is:

1. An hydraulic braking system including low pressure and high pressure pistons, means whereby fluid under pressure from such pistons may be utilized for braking purposes, lever mechanism simultaneously operating both pistons at relatively different speeds, the low pressure piston moving faster than the high pressure piston, and means controlled solely by the pressure of the high pressure piston for limiting the movement of the low pressure piston and preventing further low pressure piston effect on the fluid.

2. An hydraulic braking system including low pressure and high pressure pistons, means whereby fluid under pressure from such pistons may be utilized for braking purposes, lever mechanism for simultaneously operating the pistons at relatively different speeds, the low pressure piston moving at greater speed than the high pressure piston, and means whereby the creation of a pressure by the high pressure piston in excess of the pressure created by the low pressure piston during movement of both pistons will interrupt further movement of the low pressure piston and cut off its pressure effect on the fluid.

3. An hydraulic braking system including a low pressure piston, a high pressure piston, means whereby fluid under pressure from such pistons may be utilized for braking purposes, lever mechanism for simultaneously operating the pistons at relative speeds, the low pressure piston being moved at greater speed than the high pressure piston, and a valve in the path of fluid flow from the low pressure piston and open to the pressure of the high pressure piston, said valve being closed during movement of both pistons and under the creation of a pressure from the high pressure piston in excess of the pressure of the low pressure piston, the closing of said valve serving to interrupt further movement of the low pressure piston and negativing any fluid pressure effect from such low pressure piston.

4. An hydraulic braking system, including a low pressure piston, a high pressure piston, means for utilizing fluid under pressure from said pistons for braking purposes, arms for operating said pistons, the arm for operating the low pressure piston being of less length than the arm for operating the high pressure piston, and means for simultaneously operating said arms to compel simultaneous movement of the pistons at relative speeds, the low pressure piston being moved faster than the high pressure piston.

5. An hydraulic braking system, including a low pressure piston, a high pressure piston, means for utilizing fluid under pressure from said pistons for braking purposes, arms for operating said pistons, the arms for operating the low pressure piston being of less length than the arm for operating the high pressure piston, and means for simultaneously operating said arms to compel simultaneous movement of the pistons at relative speeds, the low pressure piston being moved faster than the high pressure piston, said means being ineffective as to the low pressure piston following a pressure generation by the high pressure piston exceeding the pressure generation of the low pressure piston.

6. An hydraulic braking system, including a low pressure piston, a high pressure piston, means for utilizing fluid under pressure from said pistons for braking purposes, arms for operating said pistons, the arm for operating the low pressure piston being of less length than the arm for operating the high pressure piston, a primary lever connected to the high pressure piston arm, a bell crank lever mounted on the same axis as the primary lever and connected to the low pressure piston arm, and a resilient connection between said levers.

7. An hydraulic braking system, including a low pressure piston, a high pressure piston, means for utilizing fluid under pressure from said pistons for braking purposes, arms for operating said pistons, the arm for operating the low pressure piston being of less length than the arm for operating the high pressure piston, a primary lever connected to the high pressure piston arm, a bell crank lever mounted on the same axis as the primary lever and connected to the low pressure piston arm, and a resilient connection between said levers, said connection insuring simultaneous initial movements of the primary lever and bell crank lever and permitting subsequent independent movement of the primary lever.

Dated this 1st day of October, 1928.

EDWARD BISHOP BOUGHTON.